Figure 5:
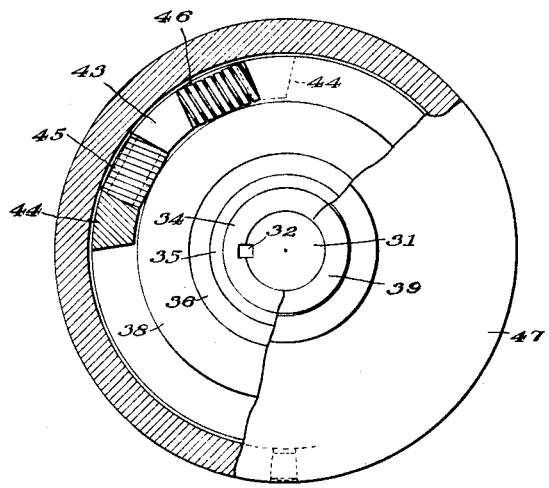

May 10, 1927.
R. M. GALLOWAY
1,627,964
LOST MOTION COUPLING
Filed March 24, 1925
2 Sheets-Sheet 1
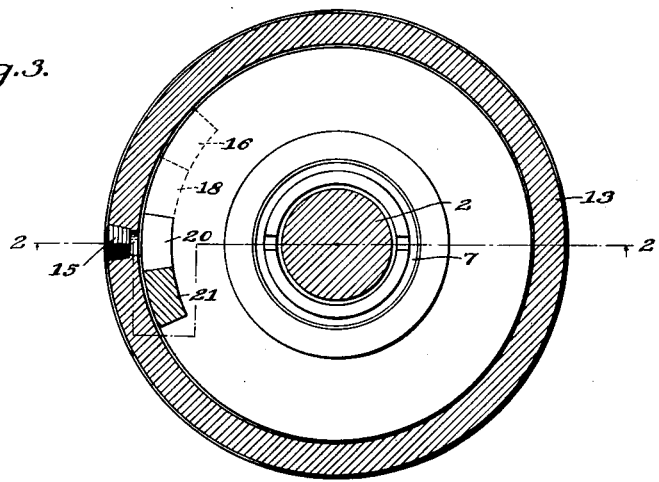
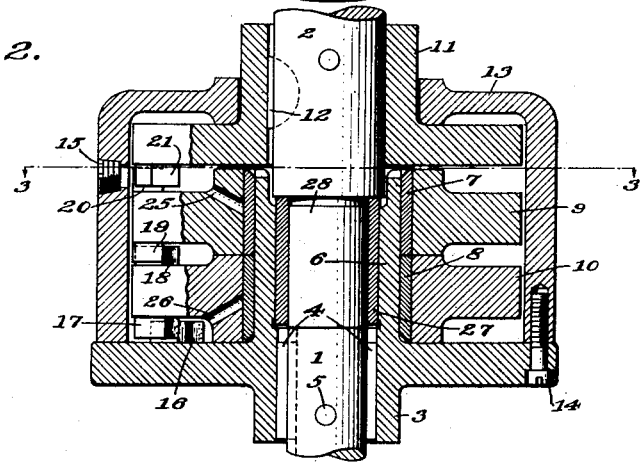
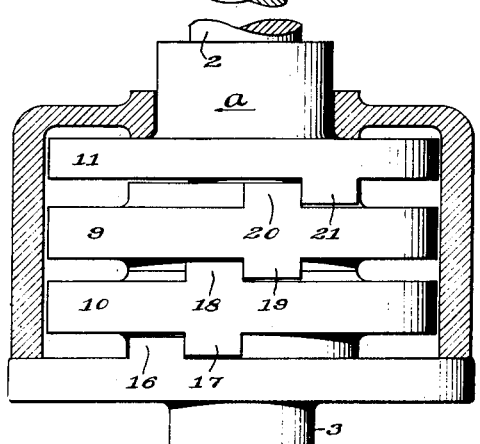
Inventor
Robert M Galloway
By Attorney
Albert J Nathan May 10, 1927.  
R. M. GALLOWAY  
LOST MOTION COUPLING  
Filed March 24, 1925

1,627,964

2 Sheets-Sheet 2

Inventor  
Robert M Galloway  
By Attorney  
Albert F. Nathan

Patented May 10, 1927.

1,627,964

UNITED STATES PATENT OFFICE.

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA.

LOST-MOTION COUPLING.

Application filed March 24, 1925. Serial No. 17,968.

This invention deals with a machine-element in the nature of a lost motion coupling which is adapted to compensate for the back-lash in a reversible mechanism and may be used with a gradually accelerating prime-mover or with an abruptly acting reversing clutch. In case the lost motion coupling is combined with an abruptly acting reversing clutch, a shock absorbing resilient means is incorporated as an inherent part of the lost motion coupling.

My invention is directed to a lost motion coupling which will not only compensate for the back-lash in a reversing mechanism, but which will protect the tools operated by reversing mechanism against abnormal stresses and strains. It has been recognized that more or less back-lash must always exist and, in view of such fact, it is considered preferable to compensate for the back-lash rather than attempt to minimize the back-lash as the problem has been attacked heretofore.

The lost motion coupling preferably comprises a driving member and a driven member which is connected to the driving member by means of a number of floating plates. The driving member, the driven member, and the plates have projecting lugs which are located to engage each other and transmit motion from the driving member to the driven member. The amount of lost motion in the coupling depends not only upon the thickness of the lugs on the plates and the member but also on the number of floating plates provided in the coupling. Preferably the amount of lost motion in the coupling is controlled by varying the number of floating plates.

The lost motion coupling may be operated either with a prime-mover, which is gradually accelerated when reversed, or with an abruptly acting reversing jaw clutch. Where an abruptly acting reversing clutch is combined with the lost motion coupling, it is preferable to provide the coupling with a shock-absorbing resilient means. When a prime-mover, such as a reversing motor, is combined with the coupling, the gradual acceleration of the motor in a reverse direction protects the lost motion coupling and the parts joined to it against abrupt shocks.

The lost motion coupling not only serves to effect the correct correlation between the reverse movements of the parts in a power operated reversing mechanism by compensating for the back-lash, but also serves to protect the tool or tools operated by the mechanism against certain abnormal stress and strains. The pause effected at the point of reversal of the mechanism permits the accumulated stress and strains to dissipate before the reverse movement of the mechanism is started.

One practical use of the present lost-motion coupling is disclosed in my co-pending application Serial Number 17,969 filed March 24, 1925.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
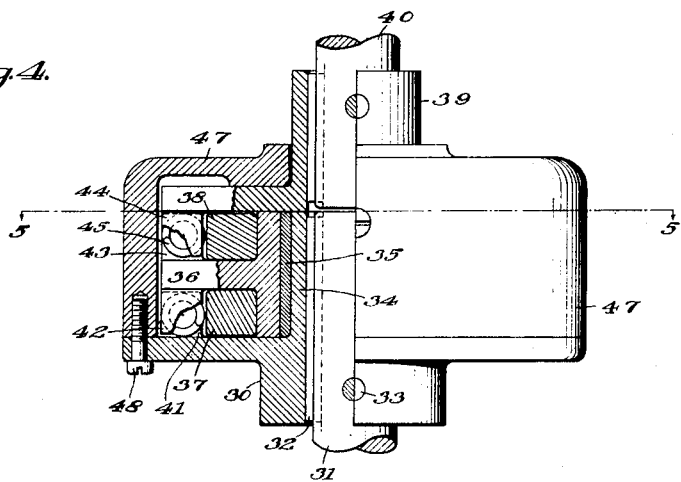

In the accompanying drawings, Figure 1 is an elevational view partially in section of a lost motion coupling constructed in accordance with my invention. Fig. 2 is a sectional view along line 2—2 of Fig. 3. Fig. 3 is a sectional view along the line 3—3 of Fig. 2. Fig. 4 is an elevational view partially in section of a lost motion connection having shock absorbing elements. Fig. 5 is a plan view partially in section of the connection shown in Fig. 4.

Referring to Figs. 1, 2 and 3 of the drawings a lost motion connection is illustrated which is adapted to connect a driving shaft 2 with a driven shaft 1. The lost motion connection comprises a driven member or sleeve plate 3 which is fixedly mounted on a driven shaft 1. Preferably, suitable keys 4 and a pin 5 are provided for securing the plate to the shaft 1. The plate 3 is provided with a hub portion 6 upon which are mounted bushings 7 and 8. The bushings 7 and 8 respectively carry two floating plates 9 and 10. Adjacent to the floating plate 9 is mounted a driving member 11 which is secured to the driving shaft 2 by a suitable key 12. The floating plates 9 and 10 and the disk portion of the driving member 11 are surrounded by a casing or housing 13 which is secured to the sleeve plate 3 by means of a screw 14. The casing or housing 13 serves to hold suitable lubricating material as for example light grease or heavy oil in engagement with the driving and driven members and the floating plates 9 and 10. An opening 15 in a housing 13 is provided for inserting lubricating material within the housing.

The sleeve plate 3 is provided with a projecting lug 16 which is adapted to be engaged by a projecting lug 17 on the floating plate 10. The floating plate 10 is provided with a second projecting lug 18 which is mounted in the path of movement of a projecting lug 19 on the floating plate 9. The floating plate 9 is provided with a second projecting lug 20 which is positioned in the path of movement of a lug 21 projecting from the driving member 11.

Referring to Fig. 1 of the drawings, motion is directly transmitted from the driving shaft 2 to the driven shaft 1 when the lugs 21 to 16 inclusive are positioned as indicated on the drawings and the shaft 2 is rotated in a direction of the arrow a. Upon rotation of the driving shaft 2 in a reverse direction, a predetermined lost motion is provided before rotation of the driven shaft 1 is effected. The lost motion produced upon reversing the direction of rotation of the driving shaft 2 depends upon the number of floating plates provided in the connection and upon the width of the projecting lugs on the floating plates and on the driving and driven members. The rotation of the shaft 2 and the driving member 11 in a reverse direction effects a complete rotation less the thickness of the projecting lugs 21 and 20 before any movement of the floating plate 9 is effected. When the lug 21 engages the opposite side of the lug 20, the floating plate 9 is rotated through a complete rotation less the thickness of the projecting lugs 19 and 18. When the lug 19 engages the opposite side of the projecting lug 18, the floating plate 10 is rotated through a complete rotation less the thickness of the projecting lugs 17 and 16. When the projecting lug 17 engages the opposite side of the projecting lug 16 the driving shaft 2 is directly connected to the driven shaft 1.

The amount of lost motion produced by a connection such as shown in Figs. 1, 2 and 3 is equal to three rotations of the driving shaft 2 less the thickness of the projecting lugs. The amount of lost motion may be varied by changing the thickness of the lugs and by varying the number of the floating plates. Preferably, the lost motion is controlled by varying the number of floating plates provided in the connection.

The floating plates 9 and 10 are preferably provided with holes 25 and 26 for supplying lubricating material to the bearing surfaces on the bushings 7 and 8 which support the floating plates. Preferably, a bushing 27 is mounted on the reduced portion 28 of the driven shaft 1 for engaging the hub portion 6 of the sleeve member 3.

A connection such as disclosed in Figs. 1, 2 and 3 is preferably used in a machine that is not reversed by an abruptly acting jaw clutch mechanism. The above described lost motion connection works very satisfactory with a mechanism having a reversing motor for changing the direction of rotation of the various moving parts. In case an abruptly acting clutch mechanism is combined with the lost motion connection, some resilient absorbing means must be provided between the various projecting lugs on the plates in the connection.

In Figs. 4 and 5 is disclosed lost motion connection which is suitable for operation with a quick acting reversing mechanism such as an ordinary so-called jaw clutch. The connection shown in Figs. 4 and 5 comprise a driven member 30 which is fixedly mounted on a driven shaft 31. Preferably, the driven member 30 is secured to the shaft 31 by a key 32 and a pin 33. A hub portion 34 on the driven member 30 carries a bushing 35. The bushing 35 supports a floating plate 36 which carries two floating rings 37 and 38. A driving member 39, which is mounted on a driving shaft 40, is positioned adjacent to the floating plate 36 which is adapted to be operated by the member 39. A lug 41, which projects from the sleeve member 30, is positioned in the path of movement of a lug 42 on the floating plate 36. A second projecting lug 43 on the floating plate 36 is positioned in the path of movement of a lug 44 on the driving member 39. Two spring members 45 and 46, which are shown in Fig. 5 of the drawings, are positioned on opposite sides of the projecting lug 43 on the floating plate. Spring members, similar to the spring members 45 and 46, are positioned on opposite sides of the lug 42 which project from the floating-plate. The floating-ring 38 serves to hold the two spring members 45 and 46 in position to be engaged by the lugs 43 and 44 and the floating ring 37 serves to hold the two spring members associated with the lugs 41 and 42 in position to be engaged by such lugs. A casing or housing 47 is provided for the coupling and preferably is secured to the sleeve plate 30 by means of a screw 48.

Assuming the driving shaft 40 to be rotating in a clockwise direction, the lug 44 projecting from the driving member 39 compresses the spring 45 between it and the lug 43 projecting from the floating plate 36. The lug 42 projecting from the opposite side of the plate 36 compresses the spring between it and the lug 41 which projects from the sleeve member 30. The spring members serve to cushion the connection against an abrupt shock on operation of a quick acting reversing mechanism. Upon reversing the direction of rotation of the shaft 40, the lug 44 is moved to the dotted line position shown adjacent to the spring member 46 as shown in Fig. 5. The counter-clockwise rotation of the driving shaft compresses the spring member 46 between it and the lug 43 projecting from the plate 36. It will be noted however that before the lug 44 engages the spring member 46, the shaft 40 and the driving member 39 have made one revolution less the thickness of the lugs 43 and 44 and the length of the spring 46. The compressing of the spring 46 serves to cushion the shock produced by the abrupt reversing of the shaft 40. The plate 36 is rotated through one revolution less the thickness of the lugs 41 and 42 and the length of one of the spring members before effecting any movement of the driven member 30. A fixed and rigid connection between the shafts 40 and 31 is not effected until complete compression of the springs which are located between the lugs on the driving and driven members and on the floating plate.

The herein disclosed coupling is applicable to a great number of mechanisms and serves among other purposes not only to compensate for lost motion but also serves, as heretofore set forth, to protect tools operated by reversing mechanisms against certain abnormal stresses and strains. The lost motion coupling is particularly applicable to reversing mechanisms which have movement in accordance with a helix. However the lost motion coupling serves to lengthen the life of cutting tools which are used on reversing mechanisms.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a lost motion coupling, the combination comprising a driving member; a driven member adapted to be operated by said driving member; a floating plate positioned between the driving and driven members; co-acting lugs projecting from the sides of said members and the floating plate for driving the driven member from the driving member and for producing a predetermined lost motion upon reversing direction of rotation of the driving member; resilient members positioned between said lugs to prevent shock upon abruptly reversing the driving member, said resilient members extending only through a portion of the total circular distances between engaging lugs; and floating rings mounted on said floating plate for holding said resilient members in position to be engaged by said lugs.

2. A lost motion coupling for driving and driven shafts comprising a disk secured to the driving shaft; a disk secured to the driven shafts; a lug projecting from each of said disks; a plurality of disks rotatably journaled intermediate said driving and driven disks and each provided with oppositely extending lugs, the lugs on the intermediate disks being adapted, by relative rotation, to engage each other and the lugs on the driving and driven disks; a casing member secured to the disk on one of said shafts and together with said disk forming a substantially oil-tight housing for all of said disks; and means permitting the insertion of lubricating material in said housing.

In witness whereof, I have hereunto subscribed my name.

ROBERT M. GALLOWAY.